United States Patent [19]
Chibata et al.

[11] 3,902,967
[45] Sept. 2, 1975

[54] PROCESS FOR PRODUCING L-ARGININE BY FERMENTATION

[75] Inventors: Ichiro Chibata, Suita; Masahiko Kisumi, Kobe; Jyoji Kato, Sakai, all of Japan

[73] Assignee: Tanabe Seiyaku Co., Ltd., Osaka, Japan

[22] Filed: Apr. 9, 1974

[21] Appl. No.: 459,349

[30] Foreign Application Priority Data
Apr. 16, 1973 Japan.................................. 48-42846

[52] U.S. Cl.................................... 195/29; 195/47
[51] Int. Cl.$^2$........................................ C12D 13/06
[58] Field of Search .................... 195/28, 29, 30, 47

[56] References Cited
UNITED STATES PATENTS
3,734,829   5/1973   Chibata et al. ...................... 195/29
3,833,473   9/1974   Kubota et al. ......................... 195/29

Primary Examiner—A. Louis Monacell
Assistant Examiner—Robert J. Warden
Attorney, Agent, or Firm—Bierman & Bierman

[57]                   ABSTRACT

A process for producing L-arginine by cultivating a pyrimidine metabolic antagonist-resistant mutant of a microorganism being capable of producing L-arginine in a medium and harvesting the produced L-arginine from the broth, wherein the suitable examples of the resistant mutant are Bacillus subtilis AHr.AUr-9 (arginine hydroxamate resistant and 6-azauracil resistant mutant), Bacillus subtilis AHr.TUr-61 (arginine hydroxamate resistant and 2-thiouracil resistant mutant) and Bacillus subtilis AHr.AUDr-62 (arginine hydroxamate resistant and 6-azauridine resistant mutant).

5 Claims, No Drawings

PROCESS FOR PRODUCING L-ARGININE BY FERMENTATION

The present invention relates to a process for producing L-arginine by fermentation. More particularly, it relates to a process for producing L-arginine by cultivating a pyrimidine metabolic antagonist-resistant mutant of a microorganism being capable of producing L-arginine in a medium and harvesting the produced L-arginine from the broth.

L-Arginine is one of natural amino acids and is useful as a medicine, the demand for which has recently been increased. The production of L-arginine is usually carried out by extraction of protein hydrolysates, but the extraction proceeding is very complicated and L-arginine produced by conventional processes is too expensive.

There have recently been reported a fermentation process for producing L-arginine by using a bacterium being resistant against L-arginine antagonist, i.e. a L-arginine metabolic antagonist-resistant mutant with defective regulatory mechanism of arginine (Appl. Microbiol. Vol. 22, pages 987–991, 1971; Arg. Biol. Chem. Vol. 36, pages 1675–1684, 1972; Japanese Patent Publication No. 3391/1973).

The microorganisms used in the present invention improve not only the biosynthesis of L-arginine but also the biosynthesis of the substance which is condensed with the intermediate for the biosynthesis of L-arginine.

That is, under taking into consideration the facts that carbamyl phosphate being an intermediate for the biosynthesis of pyrimidine nucleotide participates in the biosynthesis of L-arginine by a microorganism being capable of producing L-arginine, the present inventors have tried to mutate the microorganism to a mutant being resistant against pyrimidine metabolic antagonist, such as 5-azauracil, 6-azauracil, 2-thiouracil, 5-fluorouracil, 5-bromouracil, 5-azacytosine, 6-azacytosine and the corresponding nucleosides, and then found out that in the pyrimidine metabolic antagonist-resistant mutant, the metabolic regulation of the pyrimidine nucleotide biosynthesis is defected and thereby the capacity for producing carbamyl phospate being an intermediate for the biosynthesis is increased and the amount thereof is increased, and further that the resistant mutant can accumulate much more amount of L-arginine in a nutrient medium containing a usual carbon source in comparison with a microorganism which improves only the biosynthesis of L-arginine.

The present invention provides a process for producing L-arginine by cultivating a pyrimidine metabolic antagonist-resistant mutant of a microorganism being capable of producing L-arginine to accumulate L-arginine in a medium and separating the produced L-arginine from the broth.

The resistant mutant used in the present invention includes pyrimidine metabolic antagonist-resistant mutants derivated from a microorganism being capable of producing L-arginine, and the suitable examples thereof may be 6-azauracil resistant mutant, 2-thiouracil resistant mutant and 6-azauridine resistant mutant which may be derivated from an arginine hydrooxamate-resistant mutant of Bacillus subtilis. The representative mutants are deposited with American Type Culture Collection, U.S.A. (hereinafter, referred to as ATCC) and with Fermentation Research Institute, Agency of Industrial Science and Technology, Japan (hereinafter, referred to as FERM). They are Bacillus subtilis AHr.AUr-9 (arginine hydroxamate resistant and 6-azauracil resistant mutant: ATCC No. 31002; FERM-P No. 1998), Bacillus subtilis AHr.TUr-61 (arginine hydroxamate resistant and 2-thiouracil resistant mutant: ATCC No. 31003; FERM-P No. 1999) and Bacillus subtilis AHr.AUDr-62 (arginine hydroxamate resistant and 6-azauridine resistant mutant: ATCC No. 31004; FERM-P No. 2000).

These resistant mutants may be obtained by mutating an original strain by a conventional mutating method, for example, ultraviolet irradiation or a chemical mutating agent (e.g. N-methyl-N'-nitro-N-nitrosoguanidine, or ethyl methanesulfonate), cultivating the mutant thus obtained in a plate medium (e.g. Spizizen's minimal medium) containing 6-azauracil (0.5 mg/ml), 2-thiouracil (0.5 mg/ml) or 6-azauridine (2 mg/ml) for 3 to 4 days, and separating the large colonies thus produced.

The resistant mutants may also be obtained by any other mutating methods, for instance, by giving pyrimidine metabolic resistance to a microorganism being capable of producing L-arginine or reversely by giving at first pyrimidine metabolic resistance to a microorganism and then giving thereto a capacity of production of L-arginine, or by giving simultaneously the both properties to a microorganism.

The medium used for the cultivation of the present resistant mutants may include 5 to 15 % by weight of saccharides (e.g. glucose or starch hydrolysates) as a carbon source, 0.5 to 4 % by weight of an inorganic ammonium salt (e.g. ammonium chloride or ammonium sulfate), urea or the like as a nitrogen source and 0.02 to 2 % by weight of peptone, yeast extract, corn steep liquor or the like as an organic nutrient, and optionally a small amount of inorganic salt (e.g. potassium phosphate, magnesium sulfate, manganese sulfate or ferric sulfate). It is also preferable to add calcium carbonate or the like to maintain the pH value of the medium at 6 to 9. Furthermore, it is preferable to add 1 to 5 % by weight of glutamic acid and/or aspartic acid to the medium for enhancing the accumulation amount of the desired L-arginine.

According to the present invention, the resistant mutant may be inoculated into a medium containing above components and it is cultivated under an aerobic condition such as by strongly shaking at 25° to 37°C for 1 to 4 days and thereby the desired L-arginine is accumulated in the broth. The L-arginine is accumulated in much amount in the broth and on the other hand the by-produced amino acids other than L-arginine are included in extremely slight amount. The L-arginine thus produced can be easily harvested by a conventional method, for instance, by using an ion exchange resin.

The present invention is illustrated by the following Examples. In Examples % means % by weight.

EXAMPLE 1

To 500 ml shake flask is added a medium (pH 7.6; 30 ml) containing 8 % of glucose, 2.5 % of ammonium chloride, 3.5 % of L-glutamic acid, 0.1 % of peptone, 0.1 % of yeast extract, 0.5 % of potassium dihydrogen phosphate, 0.05 % of magnesium sulfate and 2 % of calcium carbonate, and the mixture is sterilized under a pressure. The glucose and calcium carbonate added to the medium are previously sterilized. The medium is inoculated with one platinum loop of Bacillus subtilis AHr.AUr-9 (ATCC No. 31002; FERM-P No. 1998) and subjected to shake culture at 30°C for 72 hours. L-Arginine is produced in an amount of 28.6 mg/ml in the broth.

EXAMPLE 2

To 500 ml shake flask is added a medium (pH 7.6; 30 ml) containing 8% of glucose, 2.5 % of ammonium chloride, 3.5 % of L-aspartic acid, 0.1 % of peptone, 0.1 % of yeast extract, 0.5 % of potassium dihydrogen phosphate, 0.05 % % of magnesium sulfate and 2 % of calcium carbonate and the mixture is sterilized under a pressure. The glucose and calcium carbonate added to the medium are previously sterilized. The medium is inoculated with one platinum loop of Bacillus subtilis AHr.AUr-9 (ATCC No. 31002; FERM-P No. 1998). It is treated in the same manner as described in Example 1. L-Arginine is produced in an amount of 31.2 mg/ml in the broth.

The broth (one liter) thus obtained is harvested, heated and then filtered. The filtrate is passed through a column fulfilled with Amberlite IR-120 (H type) and then the column is washed with water. The adsorbed L-arginine is eluted with 5 % aqueous ammonia. The eluate is concentrated under a reduced pressure. To the residue are added hydrochloric acid and methanol, and the precipitated crystals are separated by filtration. The crystals are recrystallized from water-containing methanol to give L-arginine hydrochloride (29 g).

EXAMPLE 3

Example 1 is repeated except that Bacillus subtilis AHr.TUr-61 (ATCC No. 31003; FERM-P No. 1999) is used instead of Bacillus subtilis AHr.AUr-9 (ATCC No. 31002; FERM-P No. 1998). L-Arginine is produced in an amount of 20.5 mg/ml in the broth.

EXAMPLE 4

Example 1 is repeated except that Bacillus subtilis AHr·AUDr-62 (ATCC No. 31004; FERM-P No. 2000) is used instead of Bacillus subtilis AHr·AUr-9 (ATCC No. 31002; FERM-P No. 1998). L-Arginine is produced in an amount of 23.9 mg/ml in the broth.

What is claimed is:

1. A process for producing L-arginine, which comprises cultivating a pyrimidine metabolic antagonist-resistant mutant of a microorganism being capable of producing L-arginine in a medium and harvesting the produced L-arginine from the broth.

2. The process according to claim 1, wherein the pyrimidine metabolic antagonist is a member selected from the group consisting of 5-azauracil, 6-azauracil, 2-thiouracil, 5-fluorouracil, 5-bromouracil, 5-azacytosine, 6-azacytosine and the corresponding nucleosides.

3. The process according to claim 1, wherein the resistant mutant is Bacillus subtilis AHr.AUr-9 (arginine hydrooxamate resistant and 6-azauracil resistant mutant: ATCC No. 31002; FERM-P No. 1998).

4. The process according to claim 1, wherein the resistant mutant is Bacillus subtilis AHr.TUr-61 (arginine hydroxamate resistant and 2-thiouracil resistant mutant: ATCC No. 31003; FERM-P No. 1999).

5. The process according to claim 1, wherein the resistant mutant is Bacillus subtilis AHr.AUDr-62 (arginine hydroxamate resistant and 6-azauridine resistant mutant: ATCC No. 31004; FERM-P No. 2000).

* * * * *